United States Patent

[11] 3,617,760

| [72] | Inventor | James J. Jones<br>Plano, Tex. |
| [21] | Appl. No. | 837,418 |
| [22] | Filed | June 30, 1969 |
| [45] | Patented | Nov. 2, 1971 |
| [73] | Assignee | Texas Instruments Incorporated<br>Dallas, Tex. |

[54] PULSE-WIDTH DETECTOR
14 Claims, 4 Drawing Figs.
[52] U.S. Cl. ................................................. 307/234,
303/21, 307/228, 307/246, 307/265, 328/67,
328/183
[51] Int. Cl. ........................................... H03k 4/08
[50] Field of Search ........................................ 307/228,
234, 246, 265; 303/21 AY, 21 BE; 328/66, 67,
181, 183, 185

[56] References Cited
UNITED STATES PATENTS
2,892,952  6/1959  McVey ........................ 307/234 X
3,364,366  1/1968  Dryden ........................ 307/228 X
3,519,313  7/1970  French et al. ................. 303/21
3,520,575  7/1970  Steigerwald ................. 303/21

Primary Examiner—Donald D. Forrer
Assistant Examiner—R. C. Woodbridge
Attorneys—James O. Dixon, Andrew M. Hassell, Harold Levine, Melvin Sharp, John E. Vandigriff, Henry T. Olsen and Michael A. Sileo, Jr.

ABSTRACT: A vehicle skid-control braking system of the type that includes circuit means for generating a signal varying in accordance with braking conditions, such as vehicle speed, wheel speed and road surface conditions. The system includes a pulse-width detector that receives a source of signals that vary from a first value to a second value and includes circuit means for storing a charge when the signal is at a first value with the charge increasing until the signal reaches a second value, and reset circuit means responsive to a reset signal generated at each change of the signal from the first value to the second value for discharging the stored charge at the beginning of each subsequent charge cycle.

PATENTED NOV 2 1971      3,617,760

INVENTOR
JAMES J. JONES

PULSE-WIDTH DETECTOR

This invention relates to pulse-width detection and, more particularly, to a pulse-width detector in the control module of a skid control vehicle-braking system.

When braking an automobile under emergency-stopping conditions or under adverse road conditions, the possibility exists that the vehicle will go into an uncontrollable skid or a controllable skid which prevents the driver from bringing his vehicle to a safe stop within the distance available. In either case, one factor that indicates an imminent skid is the deceleration rate of the rear wheels. Some improvement in vehicle stability can be achieved by automatically "pumping" or pulsing the brakes at the rear wheels in an arbitrary preprogrammed way.

Recently, a system has been developed which operates on the principle of inhibiting the normal braking action initiated by the automobile operator. In this system, wheel speed sensors generate signals proportional to wheel speed. The wheel speed signals are processed through a control module which generates a voltage to energize a solenoid in an actuator that controls the hydraulic-braking system to the rear wheels. When a skid is imminent, a command signal from the control module causes the actuator solenoid to close a vacuum passage in a diaphragm chamber. By action of the diaphragm and the normal hydraulic pressure from the master cylinder as developed by the automobile operator, the hydraulic pressure to the rear wheels is released, thereby inhibiting the rear wheel braking action. When the rear wheels spin up, the control module produces a signal to deenergize the actuator solenoid. This restores line pressure and reapplies the rear brakes. In effect, the system "pumps" the rear brakes in a manner often recommended for controlled stopping in adverse driving conditions.

The control module includes a frequency converter for each wheel speed sensor to convert a frequency-varying signal into a direct current signal. A summation in a summing amplifier of the frequency converter outputs produces a composite of the wheel speed signals. A deceleration rate detector and an acceleration rate detector respond to the output of the summing amplifier to produce outputs proportional to the rate of deceleration and the rate of acceleration, respectively, or the rear wheels of a motor vehicle. A signal proportional to the output of the summing amplifier is transferred to a vehicle velocity ramp generator and one input of a speed inhibit switch. The velocity ramp generator produces a step ramp function having an overall slope related to the actual speed of the automobile when braking to a stop. In addition to a signal related to wheel speed, the speed inhibit switch also has an input from the vehicle velocity ramp generator and an input from a pulse-width detector. An output is produced at the speed inhibit switch whenever the summation of a wheel speed signal, a velocity ramp signal, and a pulse-width signal reaches a threshold condition. The pulse-width detector produces an output signal which relates to the braking factors including 'ire condition, brake condition, and the condition of the road surface. To generate a control signal to the actuator solenoid, the output of the deceleration rate detector, the acceleration rate detector, and the speed switch must have a certain designated relationship. These three signals are the inputs to a brake controller as the last component in the control module.

An object of the present invention is to provide a pulse-width detector. Another object of this invention is to provide a pulse-width detector in a skid control vehicle braking system. A still further object of this invention is to provide apparatus for generating a current signal related to vehicle braking factors including road surface condition.

In accordance with this invention, a pulse-width detector generates a current waveform that varies with braking factors including road surface condition. A brake controller provides a variable width, square wave pulse train to the input of the pulse-width detector that includes a source of constant current to charge an information-storing circuit. Charging of the information-storing circuit takes place only when the brake controller inhibits the normal braking function. At the beginning of the inhibit cycle, a reset circuit discharges the information storage circuit in response to a reset pulse produced by differentiating the leading edge of the input pulses generated at the brake controller. A current amplifier connected to the information storage circuit produces a current signal to the speed inhibit switch that varies in accordance with pulse width of the brake controller.

A more complete understanding of the invention and its advantages will be apparent from the specification and claims and from the accompanying drawings illustrative of the invention.

Referring to the drawings.

Figure 1:
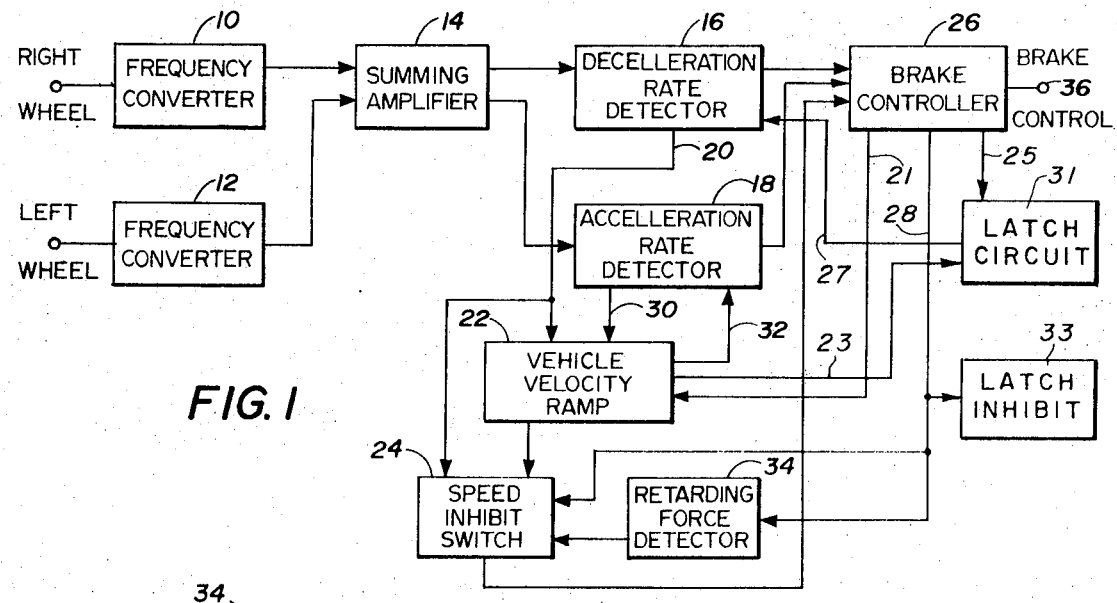
FIG. 1 is a block diagram of a control module for a skid control vehicle-braking system.

Referring to the drawings, in FIG. 1 there is illustrated the components of a control module in a skid control vehicle-braking system including frequency converters 10 and 12. The frequency converter 10 connects to a wheel sensor (not shown) at the right rear wheel of a motor vehicle. The wheel sensor generates a signal having frequency variations proportional to wheel speed. THe faster the wheel speed, the higher the frequency of the signal connected to the frequency converter 10. Similarly, the frequency converter 12 responds to a frequency dependent signal from a wheel sensor (not shown) at the left rear wheel of a motor vehicle. The output of the converters 10 and 12 is a DC voltage having a magnitude related to the right rear wheel speed and the left rear wheel speed, respectively.

These two speed-dependent voltages are connected to inputs of a summing amplifier 14 which has two output signals both proportional to the sum of the output voltages of the frequency converters 10 and 12. On of the output signals from the summing amplifier 14 connects to a deceleration rate detector 16 and the second output connects to an acceleration rate detector 18. Both the deceleration rate detector 16 and the acceleration rate detector 18 include a driver input section. The output of the driver section of the deceleration rate detector 16 appears on a line 20 and connects to inputs of a vehicle velocity ramp generator 22 and a speed inhibit switch 24. Another input to the vehicle velocity ramp generator 22 is a signal related to the output of a brake controller 26 on a line 28. A clamping circuit in the acceleration rate detector 18 and connects to the ramp generator 22.

Additional inputs to the speed inhibit switch 24, other than the voltage proportional to wheel speed on line 20, include a ramp current from the vehicle velocity ramp generator 22, the signal on the line 28 from the brake controller 26, and a retarding force current from a pulse-width detector 34. An output terminal of the speed inhibit switch 24 connects to one input of the brake controller 26. An output signal from the acceleration rate detector 18 is partially controlled by the speed inhibit switch 24. A second input to the controller 26 is the output of the deceleration rate detector 16.

In operation of the control module of FIG. 1, the frequency-varying signals generated at the right rear wheel sensor and the left rear wheel sensor are converted in frequency converters 10 and 12, respectively, into DC voltages that are combined in a summing amplifier 14 to produce inputs to a deceleration rate detector 16 and an acceleration rate detector 18. The deceleration rate detector 16 generates a signal as one input to the brake controller 26 whenever the deceleration rate of the rear wheels exceeds a set limit. The acceleration rate detector 18 generates a signal as one input to the brake controller 26 whenever the speed inhibit switch 24 does not inhibit the normal operation of the acceleration rate detector 18.

To produce a brake inhibit control signal on an output terminal 36, in which connected to a solenoid (not shown) on a brake actuator, both the detectors 16 and 18 must generate a control signal at the inputs to the brake controller 26. The speed inhibit switch 24 will release the output of the acceleration rate detector 18 whenever the three input signals thereto satisfy preset conditions, and the switch itself is not inhibited from operating.

In a typical skid control operation, the automobile operator applies pressure to the brake pedal which actuates the hydraulic brake system in the usual manner. When the deceleration rate detector 16 senses that the decrease in rear wheel speed indicates that a skid is imminent, it produces a control signal as one input to the brake controller 26. At the same time, the acceleration rate detector 18 permits the brake controller 26 to be triggered into a brake inhibit mode if the speed switch 24 has released the output of the detector 18. Whenever a control pulse from the deceleration rate detector 16 is present and the speed inhibit switch 24 releases the output of the acceleration rate detector 18, an output pulse is generated at the terminal 36 to energize a solenoid at a brake actuator. Energizing this solenoid, as explained previously, interrupts the normal hydraulic pressure applied to the rear wheels thereby inhibiting braking action.

Before the speed inhibit switch 24 will release the output of the acceleration rate detector 18, the sum of an input current related to the rear wheel speed, an input current from the vehicle velocity ramp generator 22, and an input current from the pulse-width detector 34 must reach a threshold level.

During the time interval of the brake inhibit signal at the terminal 36, hydraulic pressure is released from the rear wheels which will then begin to spin up to the speed of the vehicle. This spin-up of the rear wheels is sensed by the deceleration rate detector 16 and the acceleration rate detector 18 to cause the brake controller 26 to produce an output signal to the rear wheel brake cylinders. Also provided is a latch circuit 31 which controls the "on time" of the deceleration rate detector 16 by varying its characteristics with respect to vehicle speed and the rate of acceleration of the vehicle wheels. A latch inhibit circuit 33 prevents the latch circuit 31 from controlling the deceleration rate detector until the actuator solenoid is energized. A signal generated by the brake controller 29 and coupled to the latch inhibit circuit 33 via line 21 operates the latch inhibit circuit 33, which in turn releases the latch circuit 31 and allows it to control the "on time" of the deceleration rate detector 16. Latch circuit 31 receives input signals from the vehicle velocity ramp circuit 22 via line 23 and from the brake controller 29 via line 25 and is coupled to control the deceleration rate detector 16 via line 27. On low-mu surfaces at low vehicle speeds, the latch circuit extends the brake inhibit time or "on time" of the deceleration rate detector. Applying hydraulic pressure to the rear wheel cylinders will slow the speed of the rear wheels which will again produce conditions to actuate the brake controller 26, thereby initiating a second inhibit cycle. This operation continues with the rear wheel, speed decreasing and increasing until the vehicle has been brought to a controlled stop. In effect, the controlled module "pumps" the rear brakes in a manner often recommended for controlled vehicle stopping.

Figure 2:
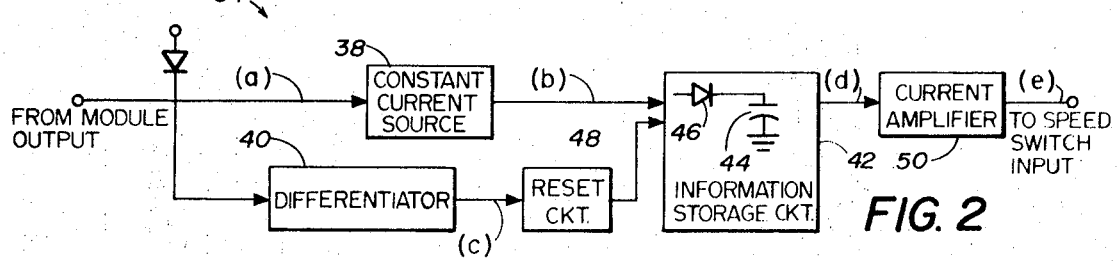
FIG. 2 is a block diagram of a pulse-width detector for generating a signal related to braking factors.
Figure 3:
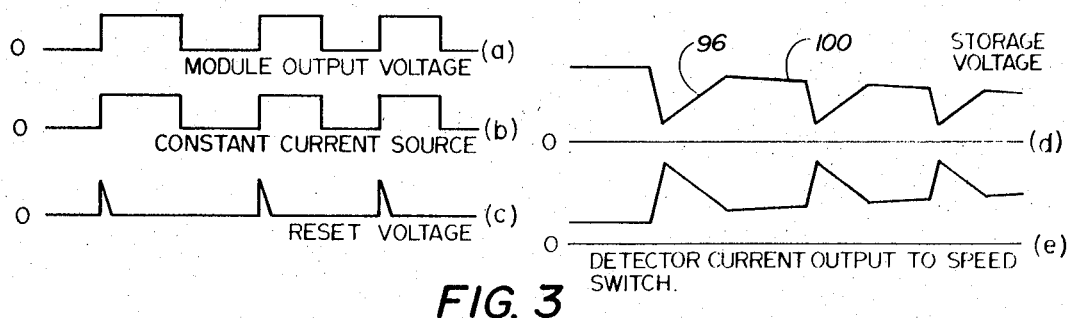
FIG. 3 illustrates the waveforms generated in the operation of a pulse-width detector in accordance with the present invention.

Referring to FIG. 2, there is shown a block diagram of the pulse-width detector 34. An input to the pulse-width detector 34 is a series of pulse coinciding with the output pulses from the brake controller 26. Both the input pulse train, as illustrated in FIG. 3a, and a regulated DC supply are connected to a constant current circuit 38 and a differentiator 40. The constant current circuit 38 produces a square wave at the output thereof, as illustrated in FIG. 3b, coinciding with the input pulses. Each pulse generated by the circuit 38 will be at the same current level. These constant current pulses are one input to an information storage circuit 42 including a capacitor 44 and a diode 46, as will be explained.

Also connected to the storage circuit 42 is a series of reset pulses from a reset circuit 48 that connects at an input to the output of the differentiator 40. These reset pulses, as illustrated in FIG. 3c, occur at the leading edge of each output pulse from the brake controller 26 to discharge the capacitor 44. By the combined operation of the constant current circuit 38 and the reset circuit 48, a voltage is produced at the output of the storage circuit 42 having a waveform as illustrated in FIG. 3d. This waveform is inverted in a current amplifier 50 to produce a current waveform to the speed switch 24, as illustrated in FIG. 3e.

Figure 4:
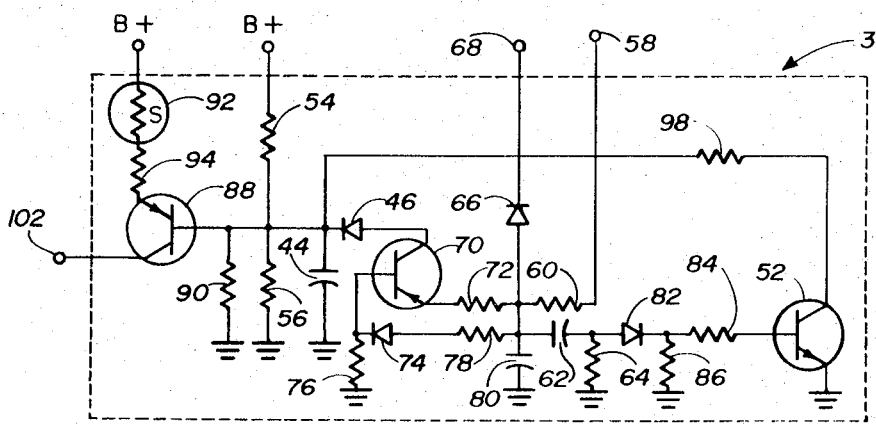
FIG. 4 is an electrical schematic of the pulse-width detector of FIG. 2.

Referring to FIG. 4, there is shown a schematic of the pulse width detector 34 including the diode 46 and the storage capacitor 44 having a connection to ground. The junction of the capacitor 44 and the diode 46 is tied to the collector electrode of a reset transistor 52 and a voltage divider network including resistors 54 and 56. Input pulses from the brake controller 26 are connected to the detector 34 at a terminal 58. Also connected to the terminal 58, through a resistor 60, is a differentiator circuit including a capacitor 62 and a resistor 64 connected to ground. The differentiator capacitor 62 also connects to a regulated DC voltage supply (not shown) at a terminal 68 through a blocking diode 66.

Both the regulated voltage supply and the pulses from the brake controller 26 are connected to the emitter electrode of a current source transistor 70 through a resistor 72. THe constant current circuit 38 includes the transistor 70 and a base-biasing circuit consisting of a diode 74 and resistors 76 and 78. A capacitor 80, connected to the resistor 78, completes the biasing circuit for the transistor 70.

The differentiated leading edge of the pulses at the terminal 58 generate a base drive at the junction of the capacitor 62 and the resistor 64 for the transistor 52. These pulses are applied to the base of the transistor 52 through an isolating diode 82 and a base resistor 84. A resistor 86 completes the base drive network for the transistor 52.

At the output terminal 102 of the pulse-width detector 34, a transistor 88 provides current amplification of the voltage at the junction of the storage for 44 and the diode 46. The base drive circuit for the transistor 88 includes a resistor 90. A resistor 92, connected to a source of DC voltage, and in series with a resistor 94, completes the emitter circuit for the transistor 88.

In operation, a voltage at the terminal 58 turns on the transistor 70 to produce a constant current in the collector-emitter junction which forward biases the diode 46 to charge the storage capacitor 44. Charging of the capacitor 44 increases along a linear curve as illustrated by the slope 96 in FIG. 3d. This charging action takes place during the brake inhibit cycle of the brake controller 26, that is, when an inhibit pulse appears at the terminal 36. When the brake controller 26 turns off, the transistor 70 is likewise turned off and the charging action of the capacitor 44 stops. By means of the resistors 54 and 56, the capacitor 44 begins a slow discharge as indicated by the section 100 of the curve illustrated at FIG. 3d. This slow discharge action continues until another inhibit pulse appears at the output of the brake controller 26. The leading edge of this next inhibit pulse is differentiated by the capacitor 62 and the resistor 64 to produce a positive base drive pulse to the transistor 52. A positive pulse at the base of the transistor 52 saturates The transistor to clamp the junction of the capacitor 44 and the diode 46 to ground through a resistor 98. This immediately discharges the capacitor 44 to a level determined by the conducting time of the transistor 52. When the base drive to the transistor 52 returns to a zero voltage level, the capacitor 44 again begins to charge through the transistor 70 which has been again turned on.

The voltage at the junction of the capacitor 44 and the diode 46 provides a base drive signal for the transistor 88 to produce a current waveform at an output terminal 102 as illustrated in FIG. 3e. This current signal is connected to one input of the speed inhibit switch 24 to vary the switching speed thereof. Note that the base line for the curve of FIG. 3e has a slight positive slope. The amount of this slope is a function of the pulse width of the brake controller output which in turn depends on the braking forces including the condition of the road surface. It is the base line level that comprises the current signal connected to the speed switch 24.

Although a preferred embodiment of the invention has been described in detail, it is to be understood that various changes, substitutions, and alterations can be made therein without departing from the spirit and scope of the invention as defined by the appended claims.

What is claimed is:

1. A pulse-width detector having an input terminal connected to a pulse train wherein the pulse train signal varies from a lower value to an upper value comprising:
   means for storing a charge when the pulse train signal is at the upper value, the charge increasing from a reset level and continuing until the pulse train signal changes to the lower value,
   differentiator means connected to the pulse train at the input terminal for generating a reset pulse at each change of the pulse train signal from the lower value to the upper value,
   a first transistor connected to said storing means and switched into a conducting state at each occurrence of a reset pulse from said differentiator means to discharge the stored charge, and
   a second transistor connected to the pulse train at the input terminal and to said storing means for generating a constant current when the pulse train signal is at the upper signal value.

2. A pulse-width detector as set forth in claim 1 wherein said storing means includes a diode connected to said second transistor and a capacitor, the junction of said capacitor and said diode connected to said first transistor.

3. A pulse-width detector as set forth in claim 1 wherein said differentiator means includes a capacitor connected to the pulse train at the input terminal and the junction of a resistor and a diode, said diode connected to the base electrode of said first transistor.

4. A pulse-width detector as set forth in claim 1 including a third transistor connected to (the junction of) said (capacitor and said diode) storing means for amplification of the signal (at the diode-capacitor junction) produced thereby.

5. A pulse-width detector having an input connected to a source of signals that vary from a first value to a second value comprising in combination
   a. means for storing a charge when said input signal is at its first value, said storing means changing from a reset level to a first level during the time said input signal is at its first value, and selectively discharging to a second level that is intermediate said reset and first levels during the time said input is at its second value;
   b. reset means coupled to the input of said detector for generating a reset signal when said input signal changes from its second value to its first value, and coupled to said storing means for rapidly discharging said storing means to said reset level.

6. The pulse-width detector of claim 5 wherein said storing means includes a diode series coupled between the input and output of said detector, and a capacitor parallel coupled between said diode and a reference voltage.

7. The pulse-width detector of claim 6 wherein said reset means is coupled to the junction of said diode and said capacitor.

8. The pulse-width detector of claim 5 wherein said reset means includes a differentiator circuit for differentiating said input signal and thereby generating said reset signal.

9. A retarding force detector in a vehicle skid control system of the type having a brake controller means that generate a control signal varying between first and second values for selectively controlling the brake system of said vehicle, said detector being responsive to said control signal, comprising in combination:
   a. storage means for storing a charge when said control signal is at its first value, said charge increasing from a reset level and continuing to a first level until said control signal changes to its second value;
   b. first discharging means coupled to said storage means for discharging said storage means to a second level intermediate said reset and first levels when said control signal it at its second value;
   c. signal-generating means for generating a reset signal when said control signal changes to its first value; and
   d. second discharging means coupled to said storage means and said signal-generating means for discharging said storage means to said reset value in response to said reset signal.

10. The retarding force detector of claim 9 wherein said storage means includes a diode coupled between the input and output of said detector and a capacitor coupled in parallel to said diode.

11. The retarding force detector of claim 9 wherein said first discharging means is a resistor parallel connected with said storage means.

12. The retarding force detector of claim 9 wherein said signal-generating means includes a differentiator circuit for differentiating said control signal and thereby generating said reset signal.

13. The retarding force detector of claim 9 wherein said second discharging means includes a transistor coupled to said signal-generating means and storage means which is switched into conduction by said reset pulse to thereby discharge said storage means to said reset level.

14. The retarding force detector of claim 9 and further including a constant current source coupled to said storage means for supplying the charge current to said storage means when said control signal is at its first value.

* * * * *